United States Patent Office 3,536,443
Patented Oct. 27, 1970

3,536,443
PROCESS FOR RECOVERING METAL COMPOUNDS
Harry Franklin Goss, Longview, Tex., assignor to Eastman Kodak Company, Rochester, N.Y., a corporation of New Jersey
No Drawing. Filed June 7, 1968, Ser. No. 735,171
Int. Cl. C01g 55/00
U.S. Cl. 23—87                                      7 Claims

ABSTRACT OF THE DISCLOSURE

Noble metals such as palladium are removed from the interior surfaces of organic reaction processing systems by dissolving the metal in an aqueous cupric chloride solution containing at least 10 volume percent acetic acid.

---

This invention is concerned with the recovery of metallic compounds. In particular it is concerned with the recovery of noble metals of Group VIII of the Periodic Table. In one of its specific embodiments, the invention relates to the recovery of palladium metal by contacting the metal with a certain acetic acid-promoted cupric chloride solution.

Compounds of noble metals of the platinum group find application in the execution of organic reactions of varying types. For example, catalyst solutions containing palladium or platinum salts and an oxidizing agent are widely used in the oxidation of olefins to obtain aldehydes, ketones, acids, esters, etc. A widely used catalyst solution for effecting such conversions comprises a mixture of palladium chloride and cupric chloride. The continuous loss of the noble metal catalysts such as palladium into the product recovery system of commercial olefin oxidation plants employing the palladium catalyst is an acknowledged problem.

Significant palladium losses are caused by the reduction of the palladium chloride catalyst to palladium metal during the course of the oxidation reaction. The palladium metal then plates out or deposits on any available surface such as the piping, column walls, column packing, etc., particularly in the product concentration area and vent scrubbers. Once so deposited, the metal adheres so strongly to the surface that removal and recovery of substantially all of the metal becomes an extremely difficult task. Since these metals are relatively costly, the practicability of their use in commercial processes is enhanced by the recovery of even the smallest amounts of these noble metals.

Various processes have been developed for the recovery of the noble metals from the surfaces of various systems but all have not been entirely successful for one reason or another. For example, oxidizing solutions such as aqua regia have been proposed. Another method includes contacting the metal deposits with elemental chlorine at elevated temperatures and leaching with a solvent such as methanol. Still another method comprises contacting the metal deposits with an aqueous or alcoholic solution of hydrochloric acid followed by passage of air or oxygen through the system. Manay of these processes either have no solubilizing effect on the plated metal or fail to remove substantially all of the metal. In addition, certain of the systems utilize reagents which are extremely corrosive to process equipment and present safety hazards to operating personnel. It is an object of this invention, therefore, to recover noble metals such as palladium in an efficient and expeditious manner from surfaces coated or plated with such metals.

In accordance with the present invention, I have discovered that the recovery of noble metals, particularly from surfaces upon which said metals are deposited, can be effected by a process which comprises contacting the metal with an aqueous oxidizing solution comprising about 0.5 to 2 moles per liter cupric chloride and at least 10 volume percent acetic acid, said solution having an electromotive force (hereinafter designated as EMF) absolute value of at least 450 millivolts.

The term "absolute value" is used herein in its usual sense to mean the numerical value of a number without regard to whether it is positive or negative. Thus, the absolute value of the number —450 is 450 and the absolute value of the number 450 is 450. Whenever the term EMF is used alone hereinafter, it is understood that we have reference to the absolute value of the EMF without regard to the sign dictated by the conventions of physical chemistry.

Surprisingly it has been found that the addition of at least 10 volume percent acetic acid to a 0.5–2 molar aqueous solution of cupric chloride results in an EMF change and an unexpected increase in the solubilizing effect of this solution on noble metals such as palladium. Contacting of the palladium metal-plated surfaces with the aqueous oxidizing solution of the invention rapidly oxidizes substantially all of the palladium metal to palladium salts which are soluble in the aqueous oxidizing solution.

The amount of acetic acid promoter provided the cupric chloride solution is an important feature of the present invention, for the addition of less than about 10 percent acetic acid to the cupric chloride solution fails to provide the promotional effect exhibited by an acetic acid concentration of at least 10 volume percent. As will be demonstrated in the examples below, addition of 4 volume percent acetic acid to the cupric chloride solution does not give a solution which effectively solubilizes and recovers substantially all of the palladium metal. Increasing the concentration of the acetic acid to 10 volume percent and above, on the other hand, effects complete solubilization of the palladium in an extraordinarily short period of time. The discovery that acetic acid-promoted cupric chloride solution of the invention would oxidize substantially all of the palladium metal so rapidly was totally unexpected for addition of hydrochloric acid to 0.5 to 2 molar cupric chloride solutions even at concentrations of 10 volume percent or more has no such promotional effect. The preferred amounts of acetic acid in the cupric chloride solution is about 10 to 20 volume percent. Somewhat higher amounts of acetic acid can be employed within the scope of the invention, however, although large volumes, e.g., 50 volume percent, can be employed no apparent benefit is ordinarily obtained therefrom.

The actual amount of acetic acid promoter selected for use in a given instance to achieve optimum results will depend primarily on the particular molar concentration of the cupric chloride solution used. Ordinarily, a cupric chloride solution containing at least 10 volume percent acetic acid which has an EMF of at least 450 millivolts is necessary for practical palladium recovery. The preferred oxidizing solutions are those exhibiting an EMF value of at least 500 millivolts. Oxidizing solutions which exhibit EMF values in the range of 900 millivolts or higher are also useful in the practice of this invention. Excellent results are obtained at EMF values in the range of about 500 to about 750 millivolts. EMF absolute values can be maintained at the desired level, if necessary, by various methods, perhaps the most convenient of which is aeration of the oxidizing solution. The EMF absolute values recited in this specification are those measured between saturated calomel and platinum electrodes at 80° C.

Contacting of the palladium metal-plated surface with the acetic acid-promoted aqueous oxidizing solution may be effected at temperatures in the range of about 10 to 150° C., preferably about 80° to 110° C. Any convenient method for effecting the contacting can be employed as, for instance, by circulating the acetic acid-promoted oxidizing solution through the processing units plated with the palladium metal.

Once the palladium has been recovered by the process of the present invention, the palladium chloride-rich oxidizing solution can be stored and reused directly as a catalyst component in the olefin oxidation process. Alternatively, the palladium can be separated from the palladium chloride-rich oxidizing solution by procedures well known in the art as, for instance, by extraction or precipitation of palladium as the free metal. A preferred procedure for separating the palladium from the palladium chloride-rich oxidizing solution is that described in U.S. application Ser. No. 693,093 filed Dec. 26, 1967, now U.S. 3,484,235 issued Dec. 16, 1969. Briefly, this procedure involves contacting the oxidizing solution containing the palladium chloride with an olefinically unsaturated compound which forms a solid, insoluble complex with the palladium chloride, precipitating the resultant insoluble palladium complex, collecting the precipitate by filtration, decantation or other means, and heating the precipitated solid to remove the complexing agent and recovering the palladium chloride or palladium metal. Illustrative of suitable complexing agents in this procedure are olefinically unsaturated hydrocarbons containing at least two double bonds such as 1,5-cyclopentadiene, tetramethyl butadiene, isoprene, 1,3 - cyclobutadiene, 1,5,9-cyclodecatriene, etc. The olefin-unsaturated complexing agents employed are those which form an insoluble complex with the palladium chloride and vaporize at a temperature below the melting point of palladium.

Although the invention has been described primarily with reference to the recovery of palladium metal deposited on processing equipment it should be realized that the invention is applicable to the recovery of deposited palladium metal regardless of the nature of the structural surface on which the free metal has been deposited. Thus, in addition to the recovery of palladium from, for instance, metal, ceramic, glass and like surfaces, the invention can be used in the recovery of palladium from spent catalysts containing free metal palladium deposited thereon. The process of the present invention can be used in the recovery of any of the noble metals of Group VIII of the Periodic Table, including ruthenium, rhodium, palladium, osmium, iridium or platinum, but is particularly useful in the recovery of palladium or platinum, especially palladium.

The following examples are included to further illustrate the invention.

EXAMPLE 1

An aqueous solution containing 10 percent acetic acid and 1.5 moles of cupric chloride per liter of solution is added to three titanium-lined distillation columns which are coated with palladium metal. This solution is held at an EMF of 500 millivolts and circulated through the columns at 80–83° C. for 8 hours. At the end of this period, the columns are completely void of plated palladium and the oxidizing solution contains 30 millimoles of palladium per liter. This solution is drained and stored for later use directly as a component in an olefin oxidation catalyst.

EXAMPLES 2–4

Ceramic packing coated with palladium metal is removed from the crude recovery column of an olefin oxidation plant. This packing is treated with cupric chloride oxidizing solutions containing from 10 to 20 volume percent acetic acid. The treatments are carried out in glass equipment with a large excess of acetic acid-promoted oxidizing solution present. Complete recovery of the palladium metal was effected in each instance as shown in Table I.

TABLE I.—OXIDIZING SOLUTION

| Example: | $CuCl_2$, M/L | Acetic acid vol., percent | EMF, mv. | Temp., °C. | Result |
|---|---|---|---|---|---|
| 2 | 1.5 | 10 | 610 | 100 | Complete recovery in 5 minutes. |
| 3 | 1.5 | 10 | 610 | 130 | Complete recovery in 2 minutes. |
| 4 | 1.5 | 20 | 680 | 80 | Complete recovery in 4 minutes. |

EXAMPLE 5

Five hundred cubic feet of ceramic packing which had been coated with palladium metal were removed from a distillation column in an olefin oxidation plant. This packing was charged to a 15 ft. x 7 ft. rubber-lined tank. Two thousand gallons of 1.5 molar cupric chloride solution containing 10 percent acetic acid was added. The solution was agitated with a circulating pump. An air sparge was used to increase the agitation. The recovery was carried out at 72° C. Recovery was complete after 120 hours. Water and acetic acid were added as required to maintain the liquid level and to maintain the acid concentration at 10 percent. A total of 1,400 troy ounces of palladium were recovered.

EXAMPLES 6–8

Ceramic packing as described in Examples 2–4 is treated in accordance with the procedure of Examples 2–4, except that the cupric chloride solutions contained less than 10 percent acetic acid. The results are reported in Table II. The data of these examples demonstrates that 1.5 molar solutions of cupric chloride containing 5 volume percent acetic acid give no noticeable recovery even when aerated. Raising the EMF of a cupric chloride solution containing 4 volume percent acetic acid to 450 millivolts still failed to provide complete recovery (only 80 percent being recovered after 2 hours). On the other hand, the process of the invention as represented by Examples 2–4 show complete recovery in a matter of 2 to 5 minutes.

TABLE II

| | Oxidizing solution | | | | |
|---|---|---|---|---|---|
| | $CuCl_2$, M/L | Acetic acid, vol. percent | EMF, mv. | Temp., °C. | Result |
| Example Number: | | | | | |
| 6 | 1.5 | 5 | 420 | 20 | No noticeable recovery in 4 days. |
| 7 | 1.5 | 5 | 440 | 20 | Aerated, No noticeable recovery in 4 days. |
| 8 | 1.5 | 4 | 450 | 100 | 80% recovery after 2 hours. |

I claim:

1. A process for the removal from the interior surfaces of an organic reaction processing system of quantities of the noble metals of Group VIII which have accumulated upon said interior surfaces during the operation of the organic reaction processing system, said process comprising contacting those interior surfaces of the organic reaction processing system upon which said accumulations of noble metals have occurred with an aqueous oxidizing solution comprising about 0.5 to 2.0 moles per liter cupric chloride and at least 10 volume percent acetic acid, maintaining at least that portion of the aqueous oxidizing solution which is in contact with the noble metal deposited on the interior surface of the organic reaction processing system at an EMF absolute value of at least 450 millivolts and at a temperature of about 10° C. to about 150° C. for a sufficient period of time to dissolve and thus remove substantially all of the noble metal from the interior surface of said organic reaction processing system and thereafter removing the oxidizing solution and noble metal from said organic reaction processing system.

2. The process of claim 1 wherein the aqueous oxidizing solution is circulated through the organic reaction processing system.

3. The process of claim 1 wherein the noble metal is platinum.

4. The process of claim 1 wherein the noble metal is palladium.

5. The process of claim 4 wherein the aqueous oxidizing solution contains about 10 to 20 volume percent acetic acid.

6. The process of claim 5 wherein the aqueous oxidizing solution which is in contact with the noble metal deposited on the organic reaction processing system has an EMF absolute value of at least 500 millivolts.

7. The process of claim 6 wherein the temperature of said aqueous oxidizing solution is about 80° C. to about 110° C.

References Cited

UNITED STATES PATENTS

| | | | |
|---|---|---|---|
| 3,210,152 | 10/1965 | van Helden et al. | 23—87 |
| 3,294,484 | 12/1966 | Ellis | 23—87 |
| 3,414,427 | 12/1968 | Levy | 23—87 XR |
| 3,427,123 | 2/1969 | Fernholz et al. | 23—87 |
| 3,437,431 | 4/1969 | Platz et al. | 23—87 XR |

EDWARD STERN, Primary Examiner

U.S. Cl. X.R.

23—50; 75—121